United States Patent
Wu et al.

(10) Patent No.: US 9,098,911 B2
(45) Date of Patent: Aug. 4, 2015

(54) DEPTH MAP GENERATION FROM A MONOSCOPIC IMAGE BASED ON COMBINED DEPTH CUES

(71) Applicants: Chen Wu, Mountain View, CA (US); Debargha Mukherjee, Sunnyvale, CA (US); Meng Wang, Mountain View, CA (US)

(72) Inventors: Chen Wu, Mountain View, CA (US); Debargha Mukherjee, Sunnyvale, CA (US); Meng Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 455 days.

(21) Appl. No.: 13/666,566

(22) Filed: Nov. 1, 2012

(65) Prior Publication Data

US 2014/0118494 A1    May 1, 2014

(51) Int. Cl.
H04N 13/00 (2006.01)
H04N 15/00 (2006.01)
G06T 7/00 (2006.01)
G06T 7/20 (2006.01)
H04N 13/02 (2006.01)

(52) U.S. Cl.
CPC ............... G06T 7/0065 (2013.01); G06T 7/20 (2013.01); H04N 13/026 (2013.01); G06T 2207/10016 (2013.01); G06T 2207/10024 (2013.01)

(58) Field of Classification Search
CPC .... G02B 27/2264; G02B 27/28; G03B 35/00; H04N 13/0246; H04N 13/0434; H04N 13/0438
USPC .......................................................... 348/44
See application file for complete search history.

(56) References Cited

U.S. PATENT DOCUMENTS

| | | | |
|---|---|---|---|
| 6,124,925 A | 9/2000 | Kaneko et al. | |
| 7,352,386 B1 | 4/2008 | Shum et al. | |
| 2004/0027346 A1 | 2/2004 | Naske | |
| 2006/0098253 A1 | 5/2006 | Masuno et al. | |
| 2007/0024614 A1 | 2/2007 | Tam et al. | |
| 2008/0150945 A1 | 6/2008 | Wang et al. | |
| 2008/0247670 A1 | 10/2008 | Tam et al. | |
| 2009/0041339 A1 | 2/2009 | Yamada et al. | |
| 2009/0116732 A1 | 5/2009 | Zhou et al. | |
| 2010/0141757 A1 | 6/2010 | Baik et al. | |
| 2011/0026840 A1 | 2/2011 | Tao et al. | |
| 2011/0081042 A1* | 4/2011 | Kim et al. ..................... 382/100 |
| 2011/0096832 A1 | 4/2011 | Zhang et al. | |
| 2011/0122225 A1 | 5/2011 | Kim et al. | |
| 2011/0158504 A1 | 6/2011 | Turner et al. | |
| 2011/0298898 A1 | 12/2011 | Jung et al. | |

(Continued)

OTHER PUBLICATIONS

PCT International Search Report and Written Opinion for PCT/IB2013/059733, Feb. 25, 2014, 7 Pages.

(Continued)

*Primary Examiner* — Jessica M Prince
(74) *Attorney, Agent, or Firm* — Fenwick & West LLP (57) ABSTRACT

A combined depth map is generated for a monoscopic image based on a weighted combination of a color depth map, a spatial depth map, and a motion depth map for the image, each describing the depth of pixels in the image relative to the image plane. The color depth map determines the depth of pixels according to their color, the spatial depth map determines the depth of pixels according to their location in the image, and the motion depth map determines the depth of pixels according to their motion in the image. Each of the depth maps is associated with a weight that is used to generate the weighted combination. The weights are adaptive to account for variation between different monoscopic images.

17 Claims, 4 Drawing Sheets

(56) References Cited

U.S. PATENT DOCUMENTS

| | | | |
|---|---|---|---|
| 2012/0113227 A1 | 5/2012 | Paik et al. | |
| 2012/0154551 A1 | 6/2012 | Inoue | |
| 2012/0162200 A1* | 6/2012 | Mishima et al. | 345/419 |
| 2012/0257815 A1* | 10/2012 | Schlosser et al. | 382/154 |
| 2012/0269424 A1 | 10/2012 | Ebata et al. | |
| 2013/0038600 A1* | 2/2013 | Wang | 345/419 |
| 2013/0044254 A1* | 2/2013 | Tzur | 348/345 |
| 2014/0098100 A1* | 4/2014 | Dane et al. | 345/427 |

OTHER PUBLICATIONS

Bourge, A., et al., (eds.) "ISO/IEC CD 23002-3 Auxiliary Video Data Representation," International Organisation for Standardisation, ISO/IEC JTC 1/SC 29/WG 11/N8038, Coding of Moving Pictures and Audio, Apr. 2006, 24 pages.

Brox, T., et. al., "High Accuracy Optical Flow Estimation Based on a Theory for Warping," Computer Vision—ECCV 2004, Lecture Notes in Computer Science, 2004, vol. 3024, pp. 25-36.

Fischler, M., et al., "Random Sample Consensus: A Paradigm for Model Fitting with Applications to Image Analysis and Automated Cartography". Comm. Of the ACM, Jun. 1981, vol. 24, No. 6, pp. 381-395.

Grundmann, M., et al., "Auto-directed video stabilization with robust L1 optimal camera paths," IEEE Conference on Computer Vision and Pattern Recognition (CVPR), 2011, pp. 225-232.

Liu, J., et. al., "Nonparametric Scene Parsing: Label Transfer via Dense Scene Alignment," IEEE, 2009, pp. 1972-1979.

Tam, W.J., et al., "Three-dimensional TV: A novel method for generating surrogate depth maps using colour information," Proceedings of SPIE-IS&T Electronic Imaging, Steoreoscopic Displays and Applications XX, vol. 7237, 72371A, 2009, 9 pages.

* cited by examiner

DEPTH MAP GENERATION FROM A MONOSCOPIC IMAGE BASED ON COMBINED DEPTH CUES

BACKGROUND

1. Field of the Invention

This disclosure relates to video processing and, in particular, to conversion of monoscopic images to stereoscopic 3D images.

2. Description of the Background Art

Stereo or "3D" videos enhance the illusion of depth perception by simulating stereopsis, thereby creating the illusion of depth through the simulation of parallax. One aspect slowing the widespread adoption of stereo videos, however, is the availability of videos in a stereo format. Traditionally, the primary way to generate stereo videos was to film in stereo using two different cameras angled from different points of view to capture depth information. Due to the difficulty and expense associated with filming in stereo, comparatively few stereo videos have been generated to date.

Furthermore, although it is currently possible to create a stereo video out of monoscopic images, some existing techniques rely on object segmentation to identify objects within an image, and then approximate to determine the depths of the objects relative to the plane of the image. Object segmentation may incorrectly determine the boundaries of objects, causing incorrect depth assignments that make it difficult for a viewer to discern what objects in the image are projected and what objects are recessed. As a consequence, existing techniques are generally not able to create stereoscopic images from monoscopic images that depict the depth of objects in the image in a consistent and accurate manner.

SUMMARY

A combined depth map is generated for a monoscopic image based on a weighted combination of a color depth map, a spatial depth map, and a motion depth map for the image, in which each of the maps describes the depth of each pixel in the image relative to the plane of the image. In one embodiment, each of the individual depth maps is associated with a weight that is used to compute the combined depth map. The weights may be adaptive to account for variation between different monoscopic images. In some cases, a depth map may be associated with a set of weights, each weight corresponding to a portion of the image, including weights for each individual pixel or group of pixels.

A color depth map describes the depth of each pixel in the image based on the color of the pixel. The color depth map is generated based on a determination that pixels having similar colors are likely to have similar depths, which provides a color depth function relating a pixel's color to a determination of its depth. In one embodiment, a weight for the color depth map is determined based on a distribution of colors in the image. The color depth map weight is scaled according to the color contrast, which represents a confidence for quantifying depth based on color.

The spatial depth map is generated by averaging the depth of pixels at each location across a large collection of representative monoscopic images. In generating the spatial depth map, a variance map indicating the variance of pixel depth at each pixel location can also be generated. The spatial depth map weight is determined based on the variance indicated by the variance map. For each pixel location that is to be analyzed, the variance map is accessed and the spatial depth map weight is scaled inversely to the variance at each location.

The motion depth map determines the depth of pixels based on their local motion, using a determination that pixels having faster motion are closer to the foreground of an image. Local motion is calculated by subtracting camera motion from the total motion of pixels between two frames. A motion depth function relates the calculated local motion to a map of pixel depth. A weight for the motion depth map is determined based on an amount of motion in the image. The percentage of pixels in the image having local motion is determined, and the motion depth map weight is increased or decreased as a function of the percentage of moving pixels.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
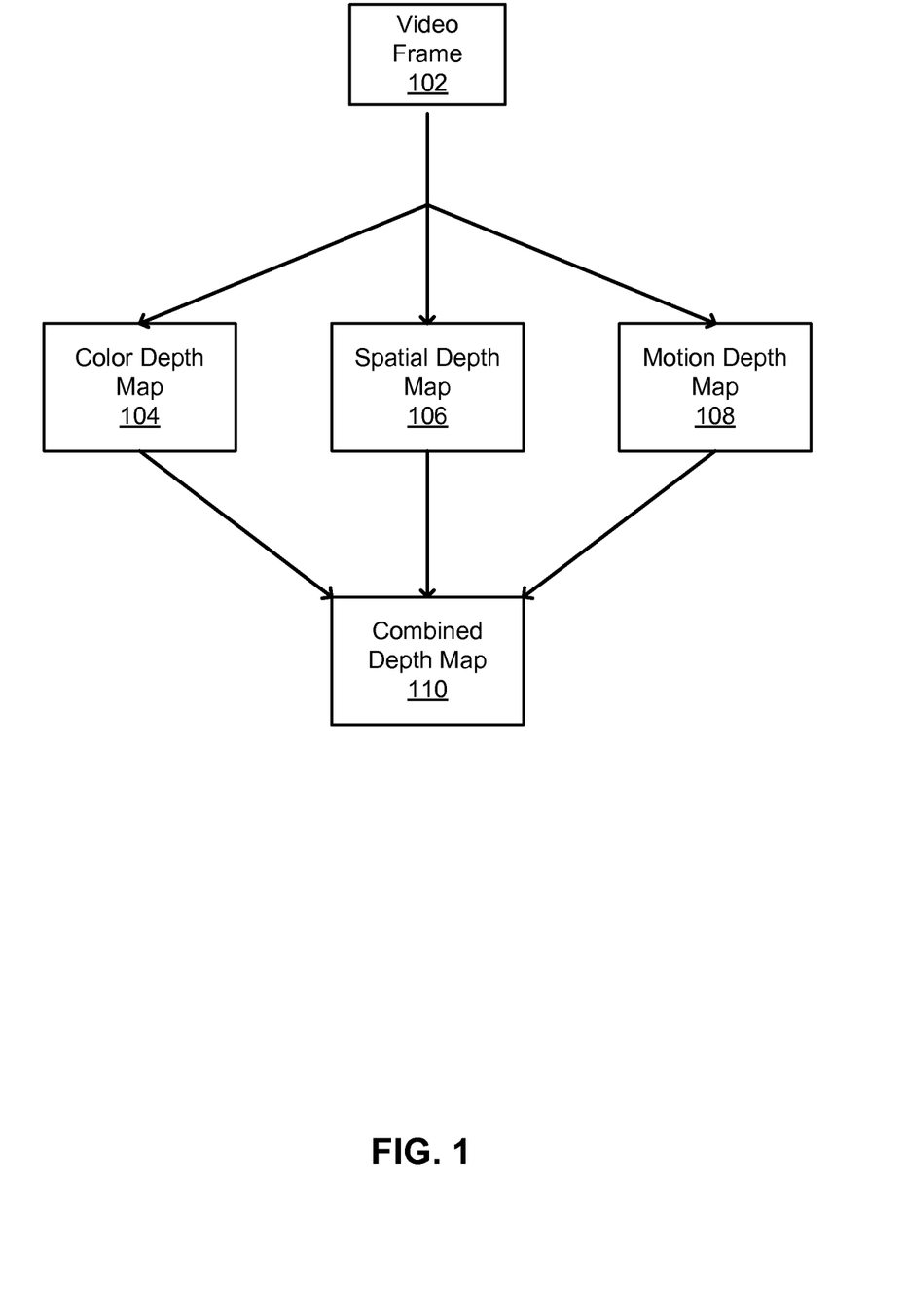
FIG. 1 illustrates an overview of generating a combined depth map of an image according to one embodiment.

FIG. 1 illustrates an overview of a process for generating a combined depth map of an image. The video frame 102 is a monoscopic image, which in one embodiment is a frame of a video filmed by a monoscopic camera. The video frame 102 has a plurality of pixels, and may depict one or more objects. Because the video frame 102 was captured by a monoscopic camera, the pixels of the video frame 102 are on the same plane, referred to herein as the image plane. The pixels do not explicitly describe the original depth relationships of the objects depicted by the video frame 102.

However, a representation of the original depth relationships of the pixels of video frame 102 can be created by generating various depth maps for the video frame 102. A color depth map 104 determines the depths of pixels in the video frame 102 using the color of the pixels as an indicator of their depth. A spatial depth map 106 determines depths using the location of pixels in the image, based on an assumption that objects in certain places in an image will have a particular depth. A motion depth map 108 uses motion between two frames, such as between frame I−1 and frame I, to determine pixel depth. Each of the color depth map 104, the spatial depth map 106, and the motion depth map 108 provide per-pixel depth values describing the amount by which a pixel is to be represented as being projected or recessed normal to the plane of the video frame 102. In one embodiment, a larger depth value indicates that a pixel is near the back of the frame, whereas a small or negative depth indicates that a pixel is near the front of the plane.

An improved depth map that employs numerous features of an image to determine pixel depths can be generated by combining several depth maps. The combined depth map 110 is a linear combination of the color depth map 104, the spatial depth map 106, and the motion depth map 108. In one embodiment, the combined depth map 110 is computed on a pixel-by-pixel basis. For example, given a depth Dcolor indicated by the color depth map 104, a depth Dspatial indicated by the spatial depth map 106, and a depth Dmotion indicated by the motion depth map 108, each describing the depth of a pixel at location (x,y) in the video frame 102, the combined depth map D(x,y) can be represented by $$D(x,y)=w1*D\text{color}(x,y)+w2*D\text{spatial}(x,y)+w3*D\text{motion}(x,y) \quad (1)$$

in which w1 is a color depth map weight, w2 is a spatial depth map weight, and w3 is a motion depth map weight. In another embodiment, the combined depth map 110 is determined for groups of pixels of the image. The combined depth maps 110 can be generated using the same or different weights for various pixels of the video frame 102, using different features of different parts of the image to most accurately determine the depth at each part.

The combined depth map 110 can be used to generate a stereoscopic image from the monoscopic image. In one embodiment, depth image based rendering (DIBR) can be used to generate a frame identical to the video frame 102 but having offset pixels. For example, if the video frame 102 is used as a left frame, DIBR creates a right frame by shifting pixels from the left frame based on the depths described by the combined depth map 110.

Figure 2:
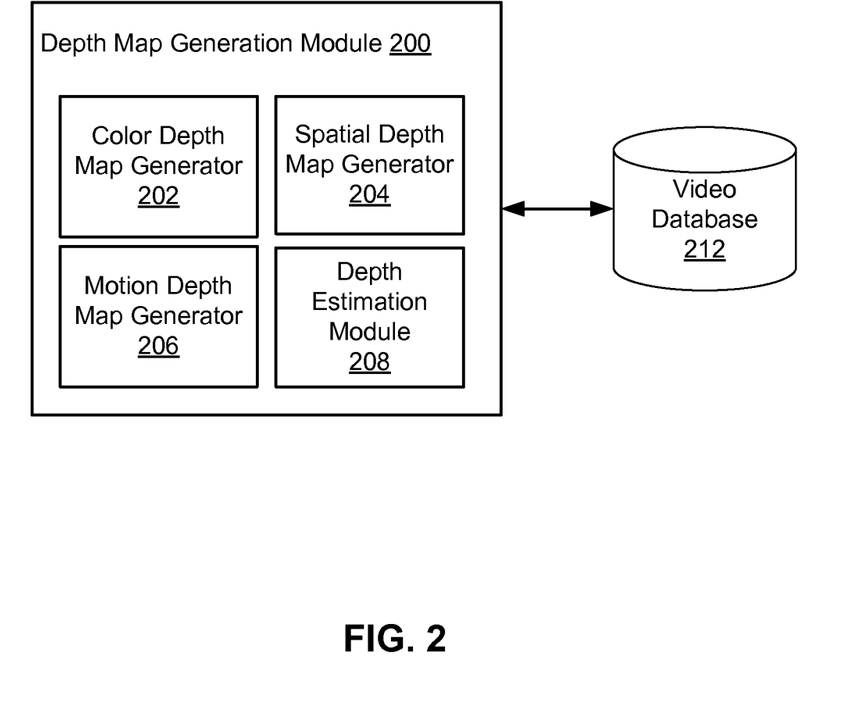
FIG. 2 is a block diagram of a depth map generation module according to one embodiment.

FIG. 2 is a block diagram of a depth map generation module 200 configured for generating the combined depth map 110, according to one embodiment. The depth map generation module 200 comprises a color depth map generator 202, a spatial depth map generator 204, a motion depth map generator 206, and a combined depth map module 208. Alternative embodiments of the depth map generation module 200 have different and/or additional modules than the ones described here. Similarly, the functions can be distributed among the modules in a different manner than is described here.

The depth map generation module 200 is configured to communicate with a video database 212. In one embodiment, the depth map generation module 200 communicates with the video database 212 through a network, such as the Internet. In other embodiments, the depth map generation module 202 communicates with the video database 212 through hardware or dedicated data communications technology. The video database 212 stores monoscopic and stereoscopic videos obtained from a variety of sources. The video database 212 may additionally or alternatively store individual images. The videos or images in the video database 212 may be obtained from users, for example by users uploading videos to a video repository or video hosting website. Videos in the video database 212 comprise a plurality of frames, each having a two-dimensional array of pixels. A particular color of a pixel may be defined in a color space, such as the RGB or YCbCr color spaces.

The depth generation module 200 processes video frames to generate one or more depth maps describing a depth of pixels in each frame relative to the image plane. In one embodiment, the depth generation module 200 generates several depth maps, each created using different depth cues in the frame, and combines the depth maps into a single representation of pixel depths. The color depth map generator 202, spatial depth map generator 204, and motion depth map generator 206 of the depth generation module 200 each use a different depth cue to generate depth maps, which are combined by depth map module 208.

Color depth map generator 202 receives the video frame 102 as an input and generates a depth map for the frame using color cues to determine the depths of pixels. In general, the color depth map generator 202 associates different colors (or ranges of colors) with different depths, based on heuristically-defined rules correlating pixel color and depth. In one embodiment, such a rule is defined by an analysis of historical depth data. The color depth map generator 202 analyzes a sample set of images in the video database 212 that were captured with a stereoscopic lens and have known depth information for each pixel color. The pixel color may be specified by a triplet indicating the intensity of each primary color in the pixel. For example, in RGB color space, white may be represented by (100%, 100%, 100%), (255, 255, 255), or #FFFFFF, indicating the maximum intensity of the red, green, and blue components. Based on this historical color depth data, the color depth map generator 202 determines an average depth (or other figure of merit) for pixels of each color or range of color. The average depth may be consolidated into a color depth prior, such as a lookup table associating each color triplet with a depth value. The color depth prior generated by the color depth map generator 202 may indicate, for example, small depth values (i.e., closer to the front of the frame) associated with pixels having more red, and higher depth values (i.e., closer to the back of the frame) associated with pixels having more blue. Such a relationship may result from objects such as sky or trees (having a primarily blue color) frequently being in the background of images, while objects such as people (having a primarily red color) are frequently positioned in the foreground.

In another embodiment, the color depth map generator 202 may use a lookup table (or equivalent function) to associate red pixels with lower depth values (i.e., closer to the front of the frame) and blue pixels with higher depth values (i.e., closer to the back of the frame), based on a relative intensity of the red and blue components of a pixel's color. In YCbCr color space, for example, the lookup table (or an equivalent function) can relate a linear combination of the blue (Cb) and red (Cr) difference components of the pixels to a determined depth of the pixels. Based on the assumption that blue pixels are typically associated with objects close to the back of the frame, the color depth function may be weighted such that a larger Cb component results in a larger pixel depth, while a larger Cr component results in a smaller or negative pixel depth. For example, the pixel depth Dcolor may be represented by a color depth function having the form:

$$D\text{color}=\alpha(Cb)+(1-\alpha)(\beta-Cr) \quad (2)$$

in which α and β are derived from the pixels. The value β represents the size of the range of possible values for Cb and Cr. For example, if Cb and Cr may have any value between 0 and 255, β equals 255.

In one embodiment, the color depth map generator 202 determines α by performing a principal component analysis that determines a direction of maximum spread within an image (or across several images) between the difference components Cb and Cr of the pixels of the analyzed image or images. After converting the RGB representations of the pixels' colors to a YCbCr representations, if applicable, the color depth map generator 202 determines for every analyzed pixel values for a and b, where a=Cr−128 and β=Cb−128. Three different expectations are computed: $s_a=E(a^2)$, $s_b=E(b^2)$, and $s_{ab}=E(ab)$, where an expectation $E(z)$ is the average value of z over all analyzed pixels. The expectations $s_a$, $s_b$, and $s_{ab}$ are used to create a matrix C defined by $$C = \begin{bmatrix} s_a & s_{ab} \\ s_{ab} & s_b \end{bmatrix}$$

The principal component analysis determines the eigenvalues and eigenvectors of C, and selects the eigenvector ν corresponding to the larger of the two eigenvalues. When scaled so that its elements sum to 1, ν has elements α and 1−α. The color depth map generator 202 uses the color depth function of Equation (2) to generate the color depth map 104 for the video frame 102.

In one embodiment, the color depth map generator 202 improves the color depth map by classifying the image as depicting an outdoor scene or an indoor scene. The classification of an image may be determined by collecting a training set of images including indoor, outdoor, and background images, each labeled with its classification. Features are extracted from the training images, such as the colors of pixels in each image. The color depth map generator 202 uses a classifier, such as a support vector machine (SVM), to build a model for classifying images according to the extracted features based on the image labels. Different color depth priors may be generated for each classification. When a new, unclassified image is received, the color depth map generator 202 extracts the same features from the new image and applies the trained model to determine a classification of the new image. The depth of the pixels in the image is then determined from the color depth prior for the image's classification.

The spatial depth map generator 204 generates another depth map for the video frame 102 based on the average pixel depth at various locations in the frame. To determine the average pixel depth, the spatial depth map generator 204 analyzes a sample set of images in the video database 212 that were captured with a stereoscopic lens and have known depth information for each pixel location. A pixel location can be expressed in terms of an actual coordinate pair (x,y), or a relative location based on percentage of offset from image origin, for example (x %, y %), where x % is the percentage of total image width for a given pixel. Thus, pixel at (320, 240) in a 640×480 image is at location (0.50, 0.50). By averaging known depths of pixels at predetermined locations across a large number of 3D images, the spatial map generator 204 generates a spatial depth prior (representing a statistical average of pixel depths at each location) and a variance prior (representing the variance of the pixels depth at each of the locations). The spatial depth prior may be configured as a lookup table relating pixel locations to depths. Similarly, the variance prior may be configured as a lookup table relating pixel locations to depth variances.

The spatial depth prior generated by the spatial map generator 204 may indicate small depth values associated with pixels positioned near the center and bottom of an image and large depth values for pixels near the top and sides, due to objects near the center and bottom of a frame commonly being positioned in the foreground of an image. In one embodiment, the spatial depth map generator 204 determines several spatial depth priors, one for each of several possible scene classifications. For example, the spatial depth map generator 204 may generate separate spatial depth priors for outdoor and indoor scenes, classified by a support vector machine as described above. In one embodiment, when the spatial depth map generator 204 receives the monoscopic video frame 102 as an input, it generates the spatial depth map 106 by setting the depth value for a pixel in the image in the spatial depth prior according to the pixel's location; this determination is made for each pixel (or group of pixels) in the image. In another embodiment, the spatial depth map generator 204 may scale the value specified by the spatial depth prior to generate a depth value for a pixel. For example, the average value in the spatial depth prior may be scaled so as to be larger for images falling into an "outdoors" classification, accounting for a potentially larger depth of field in outdoor scenes.

Figure 3:
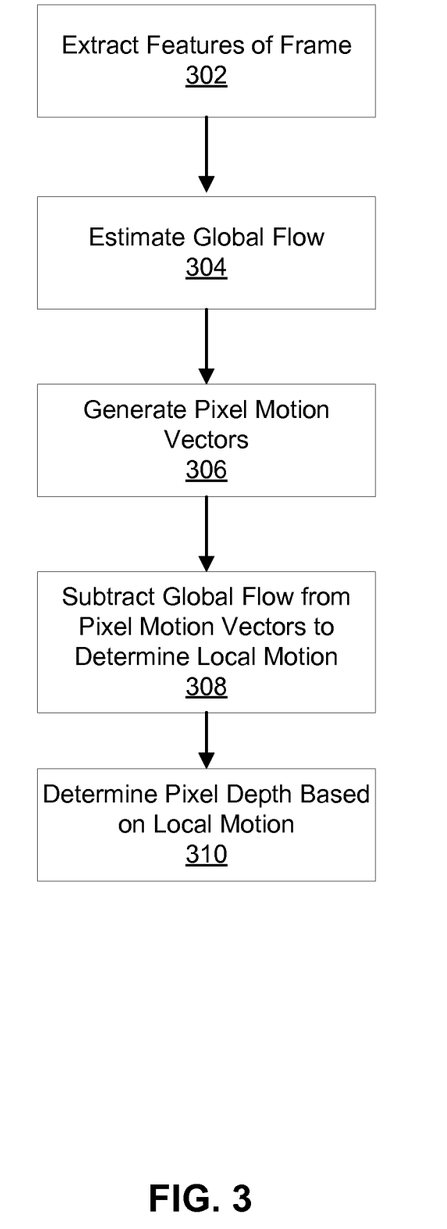
FIG. 3 is a flowchart illustrating a process for generating a motion depth map weight according to one embodiment.

The motion depth map generator 206 generates a depth map for the video frame 102 based on the motion of pixels of the video frame 102, relative to the motion of the camera. The motion depth map generator 206 uses an assumption that objects with the most motion are usually close to the front of the frame to determine depth. FIG. 3 illustrates a process employed by the motion depth map generator 206 to calculate motion between two frames and determine depth based the motion.

In order to calculate motion, the motion depth map generator 206 receives two or more video frames as an input, such as the video frame 102 and a frame prior to the frame 102 in the video sequence. Features are extracted 302 from the frames using a feature detection algorithm, such as is known to those of skill in the art. These features may comprise any of a plurality of image features, such as color features (e.g., hue and saturation in HSV color space), texture features (e.g., from a Gabor wavelet), edge features (e.g., those detected by a Canny edge detector), line features (e.g., those detected by a probabilistic Hough Transform), or features such as SIFT (Scale Invariant Feature Transform), GLOH (Gradient Location and Orientation Histogram), LESH (Local Energy based Shape Histogram), or SURF (Speeded Up Robust Features). In one embodiment, Laplacian-of-Gaussian filters are used to detect interest points in one frame, and local features are determined by computing a 118-dimension Gabor wavelet of texture features on the local region. In one embodiment, the motion depth map generator 206 extracts on the order of $10^3$ features from each frame.

After extracting features, the motion depth map generator 206 determines 304 global motion of the image by calculating the motion of the extracted feature points between the input frames. The global motion represents the movement of the camera itself. For example, if the camera was panning from left to right at a fixed rate while capturing the video, the video would have global motion corresponding to that fixed rate. For the sake of determining the global flow, it is assumed that objects in the video having local motion will include only a small subset of the pixels of each frame; the majority of the pixels are likely to have identical motion between two frames. The motion shared by the majority of pixels is the global motion of the image. In one embodiment, a random sample consensus (RANSAC) algorithm can be used to determine a robust fit of the flow, ignoring the outlying pixels having local motion to determine the global flow. The pixels having no local motion are determined by the RANSAC algorithm to be inliers, the data points whose distribution can be explained by the global flow. RANSAC is described in Martin A. Fischler and Robert C. Bolles (June 1981). "Random Sample Consensus: A Paradigm for Model Fitting with Applications to Image Analysis and Automated Cartography". *Comm. of the ACM* 24 (6): 381-395, which is incorporated by reference herein.

The RANSAC algorithm outputs a homography A mapping the location of a pixel in one frame to its location in the subsequent frame. For example, given a pixel at location ($x_0$, $y_0$) in frame $I_0$ and ($x_1, y_1$) in frame $I_1$, RANSAC determines the 3×3 homography A to minimize the error of the transformation $$A \begin{pmatrix} x_0 \\ y_0 \\ 0 \end{pmatrix} = \lambda \begin{pmatrix} x_1 \\ y_1 \\ 0 \end{pmatrix} \quad (2)$$

for all pixels determined to be inliers, assuming λ is a scalar value. After determining the homography, the motion depth map generator 206 calculates the determinant M of the matrix A, which quantifies the global motion of the pixels of video frame 102.

The motion depth map generator 206 also generates 306 total motion vectors for each pixel in the image. In one embodiment, the total motion vectors are determined by an optical flow algorithm known to those of skill in the art. Optical flow is described, for example, by Berthold K. P. Horn and Brian G. Schunck (1981), "Determining Optical Flow," *Artificial Intelligence* 17: 185-203. The optical flow algorithm employed by the motion depth map generator 206 measures the velocity of pixels between frames in a video based on spatial and temporal derivatives of pixel intensity, solved by methods such as block matching, phase correlation, or a number of variational methods.

The motion depth map generator 206 calculates the local motion of each pixel by subtracting 308 the global motion M of the frame from the motion vector of the individual pixel. Specifically, the local motion is the difference between the magnitude of a total motion vector and the determinant M of the homography A. The pixel depth can then be determined 310 based on the assumption that faster moving objects are in the foreground of the frame. In one embodiment, the motion depth map generator 206 applies a threshold to the local motion of each pixel to classify each pixel as either having motion or not having motion. Those pixels determined to have motion may be assigned a depth value of zero (placing them in the foreground), and the pixels determined to have no motion may be assigned a depth value of 255 (placing them in the background).

The depth map module 208 generates a combined depth map by calculating a weighted combination of the color depth map, the spatial depth map, and the motion depth map. The color depth map weight w1, the spatial depth map weight w2, and the motion depth map weight w3 enable the depth map module 208 to produce the combined depth map 110 from each of the individual depth maps. In one embodiment, the weights w1, w2, and w3 each have a value between zero and one, inclusive, and together sum to one.

In one embodiment, the depth map module 208 determines the weights w1, w2, and w3 heuristically. In another embodiment, the weights are adaptive based on the features of the frame, and vary across the frame according to the features at various locations.

Adaptive Color Depth Map Weight

In one embodiment, the depth map module 208 determines an adaptive weight for the color depth map of an image based on distribution of colors in the image. The adaptive color depth map weight w1 represents a confidence in being able to generate a depth map using color cues. If an image has a narrow color distribution, all pixels in the image will have the same color or similar colors, regardless of their depth in the image. Accordingly, it is beneficial to rely more on alternative depth cues, such as spatial cues or motion cues, to determine depth when the color distribution is narrow. On the other hand, the depth map module 208 will be able to determine more accurate color depths when the image has a wider color distribution, meaning that it is beneficial to increase the color depth map weight when the color distribution is wide.

In one embodiment, the depth map module 208 quantifies the distribution of colors by calculating color contrast for the image. For example, the depth map module 208 may calculate the root mean square (RMS) image contrast c based on the intensities of the pixels in the image according to the expression $$c = \sqrt{\frac{1}{mn} \sum_{i=0}^{n-1} \sum_{j=0}^{m-1} (I_{ij} - \bar{I})^2} \quad (3)$$

For an image of size m×n, $I_{ij}$ is the intensity of the pixel at position (i,j) and $\bar{I}$ is the average intensity of the pixels in the image. The value of c is normalized to be in the range [0,1]. Given upper and lower limits on the color depth map weight w1_max and w1_min, respectively, the color depth map weight w1 is determined based on the contrast c according to $$w1 = w1\_min + c(w1\_max - w1\_min) \quad (4)$$

In another embodiment, the depth map module calculates a color distribution for the image based on a discrete entropy calculated for the histograms. For example, in YCbCr color space, the depth map module 208 may retrieve color histograms hist_y, hist_cb, and hist_cr quantized in the x-axis into B bins (e.g., 255). The histograms represent the number of pixels in the frame in each color bin, for each color channel in the color space. The depth map module 208 computes the entropy H(x) of each histogram as well as the entropy of a uniform histogram with B bins. The uniform histogram, representing an equal distribution of all colors in each channel, has the maximum possible entropy H(unif). After calculating H(hist_y), H(hist_cb), and H(hist_cr), representing the entropy of the histograms in the Y, Cb, and Cr channels respectively, the depth map module 208 determines the color depth map weight w1 by averaging the ratios of the histograms to H(unif):

$$w1 = \left[ \frac{H(hist_y) + H(hist_{cb}) + H(hist_{cr})}{3 * H(unif)} \right] \times w1\_max \quad (5)$$

In Equation (5), w1_max is a heuristically-chosen upper limit on the value of w1.

Adaptive Motion Depth Map Weight

In one embodiment, the depth map module 208 determines an adaptive weight for the motion depth map based on an amount of local motion of pixels between two or more frames of the video. If the pixels of an image have little to no local motion, pixels having similar local motion will likely have different depths. As a result, the adaptive motion depth map weight w2 represents a confidence in using motion to determine depth.

The depth map module 208 calculates the adaptive motion depth map weight based on the percentage of pixels in the frame that have local motion. In one embodiment, individual pixels are assigned a binary motion value specifying either that the pixel is in motion or is not in motion. A distance threshold may be applied to the magnitude of the difference vector calculated by the motion depth map generator 206, such that a pixel having a difference vector with a magnitude above the threshold is determined to be in motion (and assigned "1" for the motion value) and a pixel having a difference vector with magnitude below the threshold is determined to be stationary (and assigned "0" for the motion value). After applying the distance threshold to the difference vectors, the depth map module 208 determines the percentage p of the pixels in the frame having local motion, that is p=(MV_1/N) where MV_1 is the number of pixels with motion value=1, N is the number of pixels in the image.

The motion depth map weight w2 is adjusted as a function of the percentage p. In one embodiment, the depth estimation module 208 applies a motion threshold to the percentage of pixels having local motion. If the percentage p is above the motion threshold, w2 is increased from a preset value by a small amount. If the percentage p is below the motion threshold, w2 is decreased by a small amount. Specifically, given a motion threshold $\epsilon$ and the percentage p, the depth estimation module 208 may determine the value of $w2_i$, corresponding to the motion depth map weight of a pixel in frame i, relative to $w2_{i-1}$, the motion depth map weight of the same pixel in frame i−1, by multiplying $w2_i$, by a value close to 1.0. For example, the depth estimation module 208 may determine $w2_i$, according to $$w2_i = \begin{cases} w2_{i-1} * 1.02, & p > \varepsilon \\ w2_{i-1} * 0.98, & p < \varepsilon \end{cases} \quad (6)$$

The multiplier values (1.02 and 0.98 in this example) can be determined heuristically, and any suitable values can be used by the depth map module 208. The depth map module 208 may also define an upper and lower limit on w2 restricting the amount the motion depth map weight can deviate from a preset value.

Adaptive Spatial Depth Map Weight

In one embodiment, the depth map module 208 determines an adaptive weight for the spatial depth map of an image based on variance of the spatial depth prior. A low variance indicates a higher probability that the average depth value at a pixel location, as specified by the spatial depth prior, accurately predicts the depth of a pixel. The variance prior generated by the spatial depth map generator 204 describes the depth variance at each pixel location. To generate an adaptive spatial depth map weight w3 for a pixel at location (x,y), the depth map module 208 finds the variance at (x,y) in the variance prior. If the variance is small, the depth map module 208 increases the value of w3, and decreases w3 if the variance is large. In one embodiment, the depth map module 208 determines w3 by a method similar to that described by Equation (6), multiplying w3 by predetermined values if the variance is above or below a preset threshold.

Generating a Combined Depth Map

If adaptive weights are used to generate a combined depth map for an image, the depth map module 208 may determine one or two adaptive weights using the methods described above and calculate the remaining weight or weights based on the determined weights, with the constraint of the three weights summing to 1.0. For example, if the depth map module 208 generates one adaptive weight (such as an adaptive w1), the remaining two weights may be defined to have a fixed ratio α such that $$\alpha = w2/w3 \quad (7)$$

The values for w2 and w3 can then be determined by $$w2 = \alpha * \frac{(1-w1)}{1+\alpha} \quad (8)$$

and $$w3 = \frac{(1-w1)}{1+\alpha}. \quad (9)$$

Alternatively, if the depth map module 208 generates two adaptive weights, the third weight can be determined by subtracting the two generated weights from the constrained value of 1.0.

Figure 4:
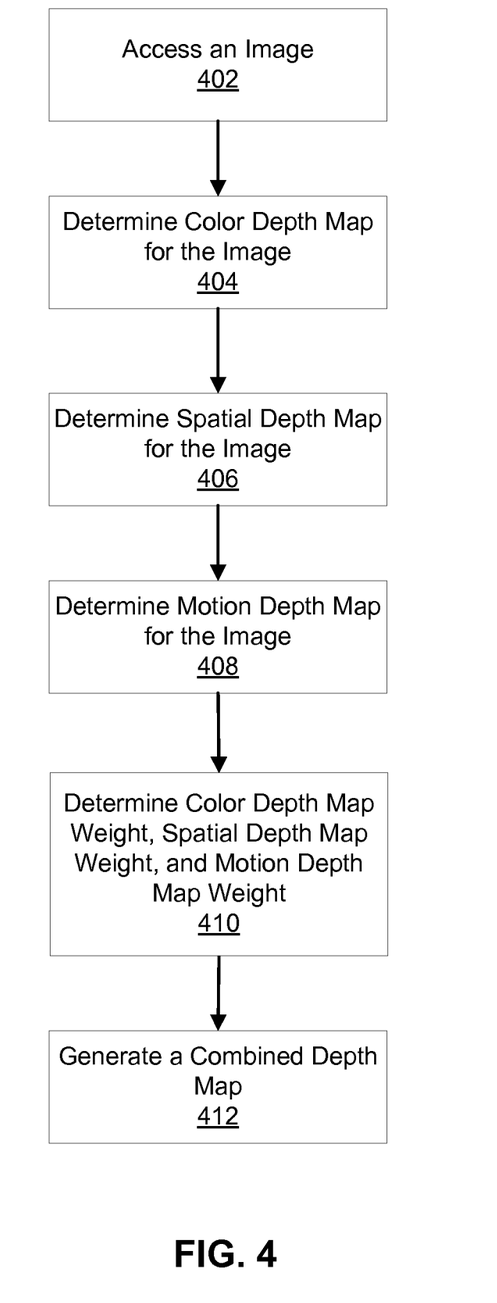
FIG. 4 is a flowchart illustrating a process for generating a combined depth map of an image according to one embodiment.

FIG. 4 is a flowchart illustrating a process for generating a combined depth map of a monoscopic image. The steps of the process can be performed by the depth map generation module 200. Other embodiments may have additional or fewer steps, and may perform the steps in a different order.

The depth map generation module 200 accesses 402 a monoscopic image having a plurality of pixels. In one embodiment, the image is a frame of a video, such as video frame 102. A color depth map is determined 404 for the image by using colors of the pixels to determine their depth. The color depth map is generated based on an assumption that pixels having similar colors will have similar depths. In one embodiment, the depth map generation module 200 accesses the color information of the pixels in the image and calculates the color depth map based on historical depth information or a color depth function.

The depth map generation module 200 also determines 406 a spatial depth map for the image by using locations of pixels to determine their depth. A spatial depth prior, calculated by averaging known pixel depths at various locations retrieved from a large number of 3D images, provides a correlation between the location of a pixel in the image and a map of its depth. In one embodiment, the spatial depth prior is a lookup table relating a pixel's location to its depth.

The depth map generation module 200 determines 408 a motion depth map for the image by using the motion of pixels between two frames to determine their depth. Pixel motion is determined by subtracting the global motion between two frames from the total motion of pixels between the same two frames.

A color depth map weight, spatial depth map weight, and motion depth map weight are also determined 410. The weights are values between zero and one, and together sum to 1.0. In one embodiment, the weights are adaptive between images and across each image, accounting for different features in the image and the reliability of each depth map method for accurately quantifying the depth of the different features.

Finally, the depth map generation module 200 generates 412 a combined depth map. The combined depth map is a linear combination of the color depth map weighted by the color depth map weight, the spatial depth map weighted by the spatial depth map weight, and the motion depth map weighted by the motion depth map weight. By generating the combined depth map, the depth map generation module 200 provides a more accurate map of the depth of pixels in the image than that provided by the individual maps alone.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a depth map of an image, the method comprising:
   accessing the image, the image comprising a plurality of pixels, wherein each pixel has a color and a location in the image;
   determining a color depth map for the image based upon the colors of the pixels in the image;
   determining a spatial depth map for the image based upon the locations of pixels and historical depth information for pixels in similar locations in a plurality of other images;
   determining a motion depth map for the image based upon pixel motion in the image;
   determining a color depth map weight, a spatial depth map weight, and a motion depth map weight, the color depth map weight determined by:
   analyzing a distribution of the colors of the pixels in the image, and
   determining the color depth map weight based on the distribution of the colors; and
   generating a combined depth map for the image from a combination of the color depth map weighted by the color depth map weight, the spatial depth map weighted by the spatial depth map weight, and the motion depth map weighted by the motion depth map weight.

2. The method of claim 1, wherein determining the spatial depth map weight comprises:
   determining historical depth variance information for the pixels in similar locations in a plurality of other images, the historical depth variance information describing a variance of the historical depth information; and
   determining the spatial depth map weight based on the historical depth variance information.

3. The method of claim 1, wherein determining the motion depth map weight comprises determining a percentage of pixels in the image having local motion, the motion depth map weight based on the percentage of pixels having local motion.

4. The method of claim 1, wherein determining the color depth map weight based on the distribution of the colors described by the histogram comprises:
   determining an entropy associated with the histogram, the entropy based on the distribution of colors;
   determining a ratio of the entropy to a maximum entropy associated with the image, the ratio describing a relative distribution of the colors; and
   determining the color depth map weight based on the ratio, the color depth map weight directly proportional to the ratio.

5. The method of claim 2, wherein determining the spatial depth map weight based on the historical depth variance information comprises:
   retrieving historical depth variance information associated with a location in the image;
   determining a first multiplier, the first multiplier having a value greater than one;
   determining a second multiplier, the second multiplier having a value less than one;
   comparing the historical depth variance information associated with the location to a variance threshold;
   wherein determining the spatial depth map weight comprises:
   responsive to a determination that the historical depth variance information associated with the location is above the variance threshold, multiplying the spatial depth map weight by the first multiplier; and
   responsive to a determination that the historical depth variance information associated with the location is below the variance threshold, multiplying the spatial depth map weight by the second multiplier.

6. The method of claim 3, further comprising:
   determining a motion depth map weight for a second image based on a percentage of pixels in the second image having local motion, the second image prior to the first image in a video sequence;
   determining a first multiplier, the first multiplier having a value greater than one;

determining a second multiplier, the second multiplier having a value less than one; and
comparing the percentage of pixels in the first image having local motion to a motion threshold;
wherein determining the motion depth map weight for the first image comprises:
responsive to a determination that the percentage of pixels in the first image having local motion is above the motion threshold, multiplying the motion depth map weight for the second image by the first multiplier; and
responsive to a determination that the percentage of pixels in the first image having local motion is below the motion threshold, multiplying the motion depth map weight for the second image by the second multiplier.

7. A non-transitory computer-readable storage medium storing computer program instructions for generating a depth map of an image, the computer program instructions executable to perform steps comprising:
accessing the image, the image comprising a plurality of pixels, wherein each pixel has a color and a location in the image;
determining a color depth map for the image based upon the colors of the pixels in the image;
determining a spatial depth map for the image based upon the locations of pixels and historical depth information for pixels in similar locations in a plurality of other images;
determining a motion depth map for the image based upon pixel motion in the image;
determining a color depth map weight, a spatial depth map weight, and a motion depth map weight, the color depth map weight determined by:
analyzing a distribution of the colors of the pixels in the image, and
determining the color depth map weight based on the distribution of the colors; and
generating a combined depth map for the image from a combination of the color depth map weighted by the color depth map weight, the spatial depth map weighted by the spatial depth map weight, and the motion depth map weighted by the motion depth map weight.

8. The non-transitory computer-readable storage medium of claim 7, wherein determining the spatial depth map weight comprises:
determining historical depth variance information for the pixels in similar locations in a plurality of other images, the historical depth variance information describing a variance of the historical depth information; and
determining the spatial depth map weight based on the historical depth variance information.

9. The non-transitory computer-readable storage medium of claim 7, wherein determining the motion depth map weight comprises determining a percentage of pixels in the image having local motion, the motion depth map weight based on the percentage of pixels having local motion.

10. The non-transitory computer-readable storage medium of claim 7, wherein determining the color depth map weight based on the distribution of the colors described by the histogram comprises:
determining an entropy associated with the histogram, the entropy based on the distribution of colors;
determining a ratio of the entropy to a maximum entropy associated with the image, the ratio describing a relative distribution of the colors; and
determining the color depth map weight based on the ratio, the color depth map weight directly proportional to the ratio.

11. The non-transitory computer-readable storage medium of claim 8, wherein determining the spatial depth map weight based on the historical depth variance information comprises:
retrieving historical depth variance information associated with a location in the image;
determining a first multiplier, the first multiplier having a value greater than one;
determining a second multiplier, the second multiplier having a value less than one;
comparing the historical depth variance information associated with the location to a variance threshold;
wherein determining the spatial depth map weight comprises:
responsive to a determination that the historical depth variance information associated with the location is above the variance threshold, multiplying the spatial depth map weight by the first multiplier; and
responsive to a determination that the historical depth variance information associated with the location is below the variance threshold, multiplying the spatial depth map weight by the second multiplier.

12. The non-transitory computer-readable storage medium of claim 9, the steps further comprising:
determining a motion depth map weight for a second image based on a percentage of pixels in the second image having local motion, the second image prior to the first image in a video sequence;
determining a first multiplier, the first multiplier having a value greater than one;
determining a second multiplier, the second multiplier having a value less than one;
comparing the percentage of pixels in the first image having local motion to a motion threshold; and
wherein determining the motion depth map weight for the first image comprises:
responsive to a determination that the percentage of pixels in the first image having local motion is above the motion threshold, multiplying the motion depth map weight for the second image by the first multiplier; and
responsive to a determination that the percentage of pixels in the first image having local motion is below the motion threshold, multiplying the motion depth map weight for the second image by the second multiplier.

13. A system for generating a depth map of an image, comprising:
a non-transitory computer-readable storage medium storing computer program instructions executable to perform steps comprising:
accessing the image, the image comprising a plurality of pixels, wherein each pixel has a color and a location in the image;
determining a color depth map for the image based upon the colors of the pixels in the image;
determining a spatial depth map for the image based upon the locations of pixels and historical depth information for pixels in similar locations in a plurality of other images;
determining a motion depth map for the image based upon pixel motion in the image;
determining a color depth map weight, a spatial depth map weight, and a motion depth map weight, the color depth map weight determined by:
analyzing a distribution of the colors of the pixels in the image, and
determining the color depth map weight based on the distribution of the colors; and generating a combined depth map for the image from a combination of the color depth map weighted by the color depth map weight, the spatial depth map weighted by the spatial depth map weight, and the motion depth map weighted by the motion depth map weight; and a processor for executing the computer program instructions.

14. The system of claim 13, wherein determining the spatial depth map weight comprises:

determining historical depth variance information for the pixels in similar locations in a plurality of other images, the historical depth variance information describing a variance of the historical depth information; and determining the spatial depth map weight based on the historical depth variance information.

15. The system of claim 13, wherein determining the motion depth map weight comprises determining a percentage of moving pixels in the image, the motion depth map weight based on the percentage of moving pixels.

16. The system of claim 13, wherein determining the color depth map weight based on the distribution of the colors described by the histogram comprises:

determining an entropy associated with the histogram, the entropy based on the distribution of colors;

determining a ratio of the entropy to a maximum entropy associated with the image, the ratio describing a relative distribution of the colors; and determining the color depth map weight based on the ratio, the color depth map weight directly proportional to the ratio.

17. The system of claim 14, wherein determining the spatial depth map weight based on the historical depth variance information comprises:

retrieving historical depth variance information associated with a location in the image;

determining a first multiplier, the first multiplier having a value greater than one;

determining a second multiplier, the second multiplier having a value less than one;

comparing the historical depth variance information associated with the location to a variance threshold;

wherein determining the spatial depth map weight comprises:

responsive to a determination that the historical depth variance information associated with the location is above the variance threshold, multiplying the spatial depth map weight by the first multiplier; and responsive to a determination that the historical depth variance information associated with the location is below the variance threshold, multiplying the spatial depth map weight by the second multiplier.

* * * * *